United States Patent
Hiraguchi

(10) Patent No.: US 7,104,488 B2
(45) Date of Patent: Sep. 12, 2006

(54) GRIPPED PART STRUCTURE OF RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 113 days.

(21) Appl. No.: 10/355,240

(22) Filed: Jan. 31, 2003

(65) Prior Publication Data

US 2003/0155460 A1    Aug. 21, 2003

(30) Foreign Application Priority Data

Feb. 1, 2002    (JP)    ............................. 2002-025628

(51) Int. Cl.
*G11B 23/107*    (2006.01)

(52) U.S. Cl. .................... 242/348; 242/348.2; 360/132

(58) Field of Classification Search ................ 242/347, 242/348, 348.2; 360/132
See application file for complete search history.

(56) References Cited

U.S. PATENT DOCUMENTS 5,456,528 A    10/1995    Dalziel

| 6,304,416 B1 * | 10/2001 | McAllister et al. ......... 360/132 |
| 6,695,241 B1 * | 2/2004 | Iino ........................... 272/348 |
| 6,764,037 B1 * | 7/2004 | Hancock et al. ............ 242/348 |
| 2003/0156356 A1 * | 8/2003 | Argumedo et al. ......... 360/132 |

FOREIGN PATENT DOCUMENTS

| JP | 10-283751 | 10/1998 |
| JP | 11-126398 | 5/1999 |
| JP | 11-185432 | 7/1999 |

* cited by examiner

*Primary Examiner*—John Q. Nguyen
(74) *Attorney, Agent, or Firm*—Sughrue Mion, PLLC

(57) ABSTRACT

A gripped part structure of recording tape cartridges of different types housed in a same library, with each recording tape cartridge including a case housing therein recording tape, and two gripped parts that are gripped by a gripping mechanism of the library, wherein the gripped parts are formed in the case, and a distance from a side wall of the case facing the gripping mechanism of the library to the gripped parts, a height of the gripped parts in a thickness direction of the recording tape cartridge is identical for each recording tape cartridge regardless of the type of recording tape cartridge, and a distance between the gripped parts cartridge is identical for each recording tape cartridge regardless of the type of recording tape cartridge.

18 Claims, 6 Drawing Sheets

GRIPPED PART STRUCTURE OF RECORDING TAPE CARTRIDGE

BACKGROUND OF THE INVENTION

1. Field of the Invention

The present invention relates to the structure of gripped parts disposed in a recording tape cartridge comprising a case within which is housed a single reel wound with magnetic tape mainly used as a recording and playback medium for computers and the like.

2. Description of the Related Art

Recording tape cartridges (e.g., magnetic tape cartridges) comprising a case within which is housed a single reel wound with magnetic tape mainly used as a recording and playback medium for computers and the like have conventionally been known. A leader member, such as a leader pin, a leader tape, or a leader block, is disposed at a leading end or free end of the magnetic tape. A pull-out mechanism disposed at a drive device pulls out the leader member through an opening in the recording tape cartridge and winds the magnetic tape fixed to the leader member around a take-up reel of the drive device.

A reel gear is annularly disposed in a bottom surface center of the reel, which is exposed through an open hole that penetrates a bottom surface of the recording tape cartridge. The reel is rotatingly driven by a drive gear disposed at a rotating shaft of the drive device meshing with the reel gear. Data is recorded on the magnetic tape, and data recorded on the magnetic tape is played back, by synchronously rotating the reel of the recording tape cartridge and the take-up reel of the drive device.

Recording tape cartridges of this structure are ordinarily housed in a storage called a library 70, as shown in FIG. 6. A desired recording tape cartridge 11 is automatically taken out by a gripping device, such as a robotic hand 60, conveyed to one of several drive devices 80, and loaded therein, where data is recorded and played back.

Namely, the robotic hand 60 is moveable vertically and horizontally along guide rails 66 and 68, and can be disposed to face each housing chamber 72 of the library 70 and loading ports 82 of the drive devices 80. Therefore, when the desired recording tape cartridge 11 is to be taken out from among many recording tape cartridges, the robotic hand 60 is first moved along the guide rails 66 and 68 to a position facing the desired recording tape cartridge 11.

As shown in FIG. 5, the robotic hand 60 is moved horizontally forward, claws 62 at a leading end of the robotic hand 60 are inserted into engagement portions or recesses 47 disposed at both side walls, which are substantially parallel to the direction of movement, of the recording tape cartridge 11, and a bottom surface on a rear wall side is supported at a planar support 64. Thus, the recording tape cartridge 11 is gripped by the robotic hand 60. Thereafter, the recording tape cartridge 11 is taken out from the housing chamber 72 of the library 70 by the robotic hand 60 moving horizontally rearward, and conveyed to the desired drive device 80. The recording tape cartridge 11 is loaded into the drive device 80 after it has been moved to a position facing the loading port 82 of the drive device 80.

In this manner, the recording tape cartridges are housed in the respective housing chambers 72 of the library 70, and loaded into the drive devices 80 by the robotic hand 60. However, the size of the outer shape, i.e., the length, width, and height of the recording tape cartridges differ per type of leader member, and when the library 70 is disposed for each different sized recording tape cartridge (i.e., for recording tape cartridges having different leader members), problems arise in terms of space and cost.

In a case where many different sized recording tape cartridges are housed in one library device 70 and the distance between the claws of the robotic hand cannot be adjusted, errors occur, such as the robotic hand being unable to sufficiently grip and dropping the recording tape cartridge, and sometimes the recording tape cartridge itself sustains damage. Even in an instance where the distance between the claws can be adjusted, it becomes necessary to adjust that distance between the claws per different sized recording tape cartridge. Therefore, there is a loss in labor time in conveying the recording tape cartridge from the library 70 to the drive device 80 and loading it therein.

SUMMARY OF THE INVENTION

It is an object of the present invention to provide a gripped part structure of a recording tape cartridge in which gripped parts of various different sized recording tape cartridges engaged by at least a gripping mechanism (claws of a robotic hand) of a library are made common, i.e., standardized, and in which costs are reduced and labor time is shortened.

A first aspect of the invention is a gripped part structure of recording tape cartridges for allowing different types of recording tape cartridges, which each include a case rotatably housing therein a reel wound with recording tape and gripped parts that are formed in the case and gripped by a gripping mechanism of a library, to be housed in a same library, wherein a height of the gripped parts from a housing chamber bottom surface when the recording tape cartridges are housed in respective housing chambers of the library is identical for each recording tape cartridge regardless of the type of recording tape cartridge, and a distance between the gripped parts in both side walls of the case parallel to a direction in which the recording tape cartridge is housed in the library is identical for each recording tape cartridge regardless of the type of recording tape cartridge.

In the recording tape cartridge of the above structure, the height from the bottom floor of the housing chamber of the library to the gripped parts and the distance between the gripped parts in both sides of the case, i.e., the horizontal width of the case, are always a fixed size or dimension regardless of the recording tape cartridge. Thus, it suffices even if the gripping mechanism (in the present invention, a robotic hand) has a simple structure that can only grip recording tape cartridges of a predetermined size, whereby costs can be decreased and labor time can be reduced.

A second aspect of the invention is a gripped part structure of recording tape cartridges of different types housed in a same library, with each recording tape cartridge including a case housing therein recording tape, and two gripped parts that are gripped by a gripping mechanism of the library, wherein the gripped parts are formed in the case, a distance from a side wall of the case facing the gripping mechanism of the library to the gripped parts is identical for each recording tape cartridge regardless of the type of recording tape cartridge, a height of the gripped parts in a thickness direction of the recording tape cartridge is identical for each recording tape cartridge regardless of the type of recording tape cartridge, and a distance between the gripped parts is identical for each recording tape cartridge regardless of the type of recording tape cartridge.

A third aspect of the invention is a method of forming gripped parts of recording tape cartridges of different types that include a case housing recording tape and are housed in a same library, which gripped parts are gripped by a gripping mechanism of the library, the method including the steps of: (a) setting a distance from a wall surface of the case that faces the gripping mechanism of the library to positions at which the gripping mechanism grips the case; (b) setting a height of the gripped parts to be formed in a thickness direction of the recording tape cartridges; (c) setting a distance between the gripped parts to be formed; and (d) forming the gripped parts in the case of the recording tape cartridge on the basis of the set distance to the gripping positions, the height, and the distance between the gripped parts.

DESCRIPTION OF THE PREFERRED EMBODIMENT

A recording tape cartridge 10 pertaining to an embodiment of the invention will now be described with reference to the drawings. First, the overall structure of the recording tape cartridge 10 will be described, and then relevant parts pertaining to the invention will be described in detail. For convenience of explanation, the direction in which the recording tape cartridge 10 is loaded into a drive device 80 is indicated by arrow A and will be referred to as the front direction or front side of the recording tape cartridge 10. The direction of arrow B, which is orthogonal to the direction of arrow A, will be referred to as the right direction.

Overall Structure of Recording Tape Cartridge

Figure 1:
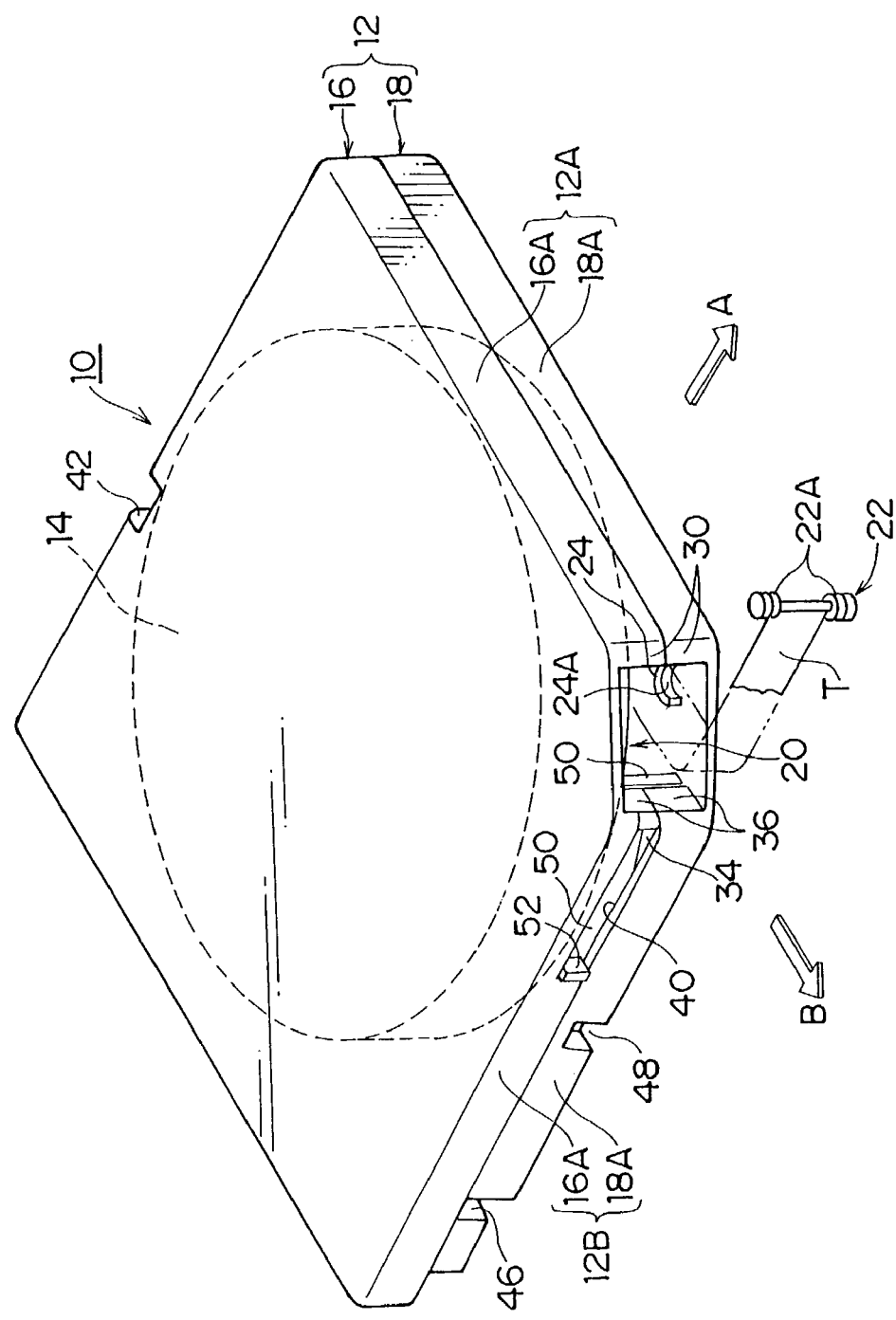
FIG. 1 is a schematic perspective view of a recording tape cartridge of the invention.
Figure 2:
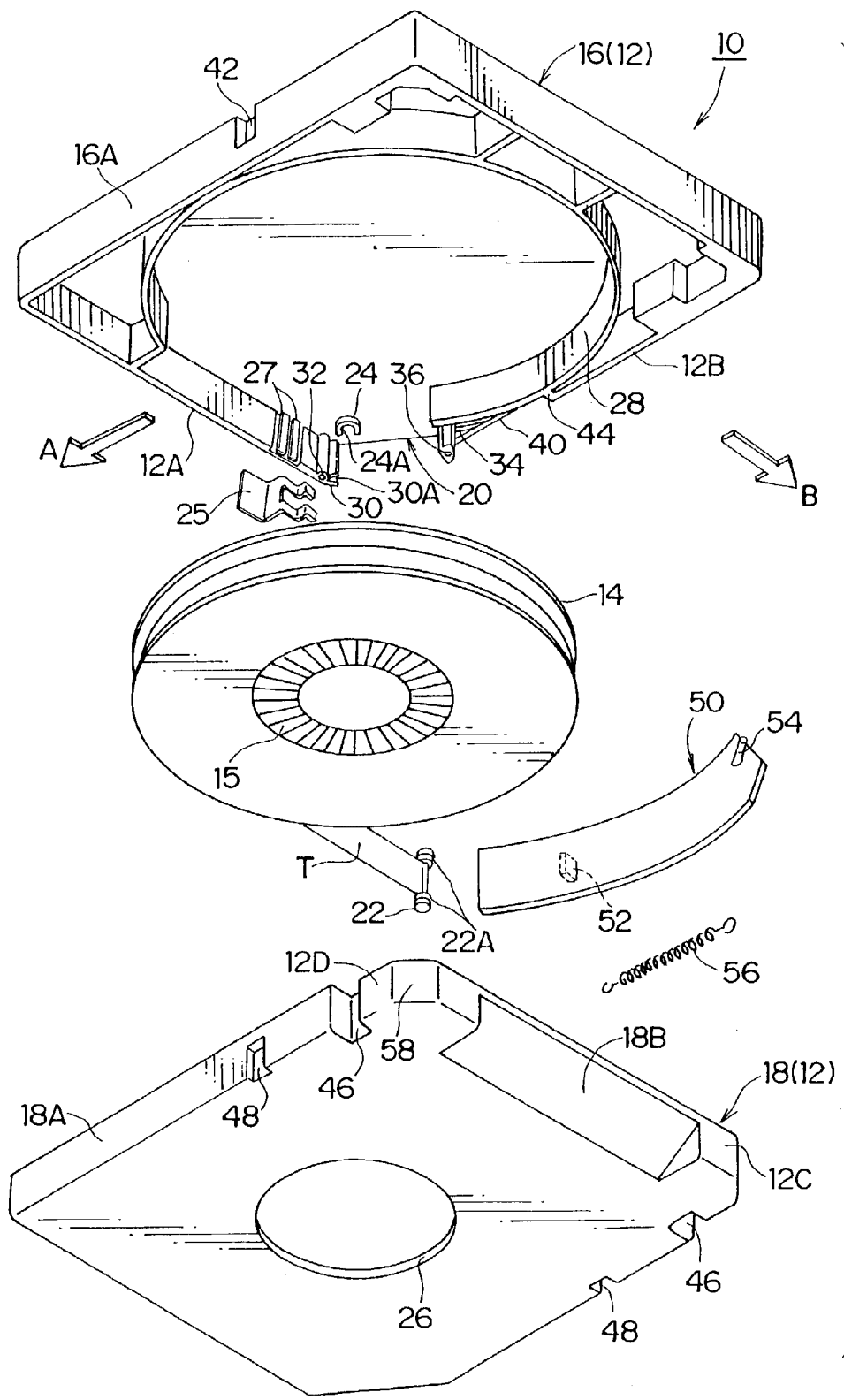
FIG. 2 is a schematic exploded perspective view of the recording tape cartridge of the invention.
Figure 6:
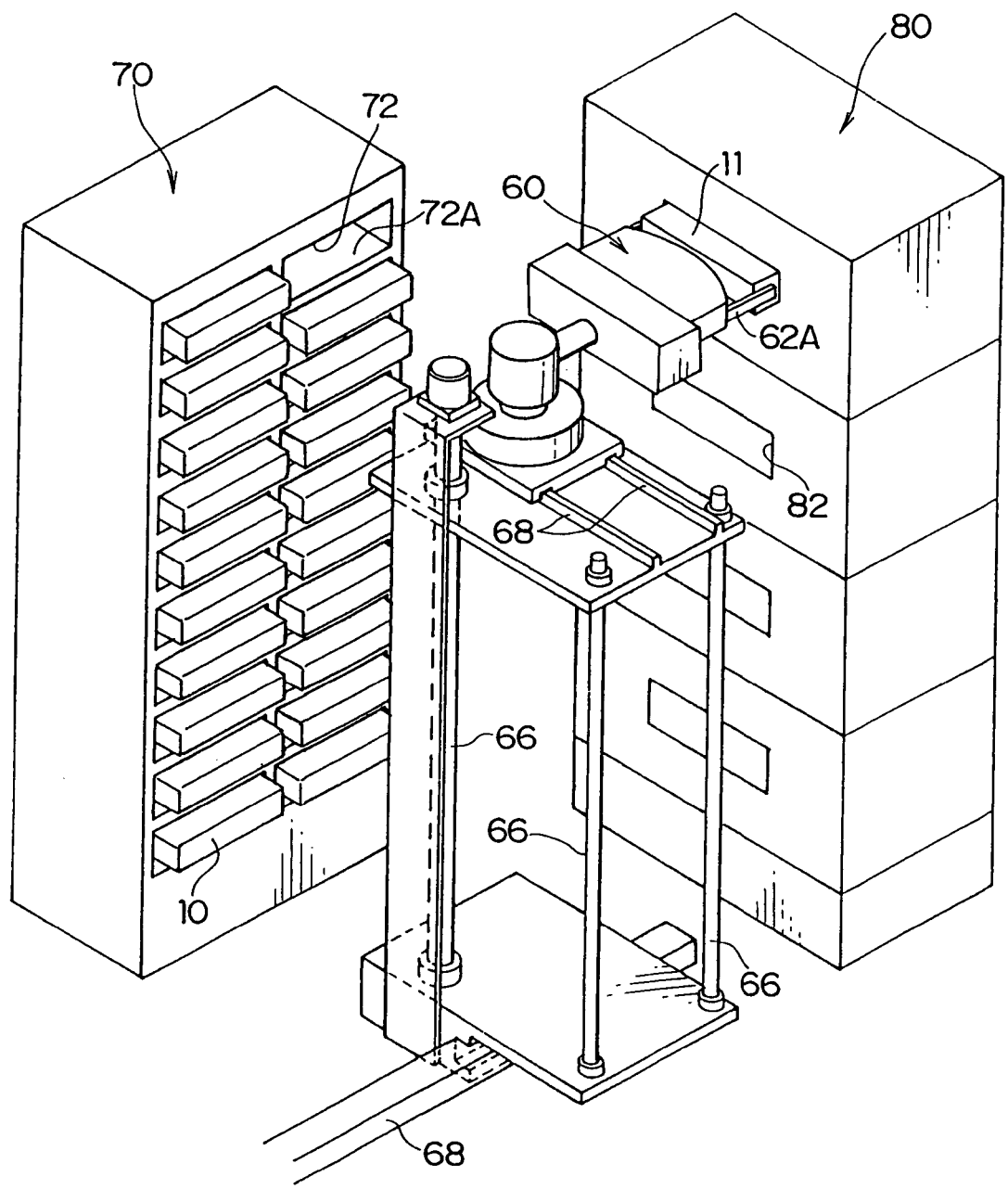
FIG. 6 is a schematic perspective view showing drive devices and a library.

As shown in FIGS. 1 and 2, the recording tape cartridge 10 rotatably houses within a substantially rectangular case 12 a single reel 14, around which is wound magnetic tape T that serves as recording tape and is a medium for recording and playing back information. The case 12 is formed by joining an upper case 16 and a lower case 18 by fitting together mutual peripheral walls 16A and 18A. The front right corner of each of the upper case 16 and the lower case 18, which front right corner is a corner at a head side in the direction in which the recording tape cartridge 10 is loaded into the drive device 80 (see FIG. 6), is cut out. A housing space for the reel 14, around which the magnetic tape T is wound, is disposed within the case 12.

The corner, from which the peripheral walls 16A and 18A of the upper case 16 and the lower case 18 have been cut out, serves as an opening 20 through which the magnetic tape T is pulled out. A leader pin 22, which is retained and pulled out by a pull-out mechanism (not illustrated) of the drive device 80, is connected to a free end of the magnetic tape T that is pulled out through the opening 20. An annular groove 22A is formed at each end of the leader pin 22 that protrudes from width-direction edges of the magnetic tape T. The annular grooves 22A are retained by hooks or the like of the pull-out mechanism. Thus, when the magnetic tape T is pulled out, the hooks do not contact and damage the magnetic tape T.

A pair of upper and lower pin holders 24 that position and hold the leader pin 22 inside the case 12 is disposed inside the opening 20 of the case 12. The pin holders 24 are formed as recesses, and the ends of the leader pin 22 are held in recesses 24A of the pin holders 24 in a state in which the leader pin 22 is upright therein. Outer peripheral walls of the pin holders 24 at the side at which the magnetic tape T is pulled out are open and form a gateway through which the leader pin 22 can enter and exit.

A plate spring 25 is fixedly disposed near the pin holders 24. A base of the plate spring 25 is inserted into a spring retainer 27 disposed at an inner side of a front wall 12A (of the peripheral walls 16A and 18A, a portion where the outer surface faces the direction of arrow A), and is fixed thereat. The plate spring 25 engages the upper and lower ends of the leader pin 22 and holds the leader pin 22 in the pin holders 24. When the leader pin 22 enters and exits the pin holders 24, the plate spring 25 elastically deforms to allow movement of the leader pin 22.

A gear opening 26 for exposing a reel gear 15 of the reel 14 to the outside is disposed in a center of the lower case 18. The reel gear 15 meshes with a drive gear (not illustrated) of the drive device 80, whereby the reel 14 is rotatably driven inside the case 12. The reel 14 partially projects from an inner surface of the upper case 16 and the lower case 18, and is held by a play regulating wall 28, i.e., an inner wall located on a circular locus that is concentric with the gear opening 26, so that the reel 14 does not chatter. Because ends of the play regulating wall 28 are disposed connectedly with the peripheral wall 16A or the peripheral wall 18A of the case 12, the play regulating wall 28 partitions off the space in which the reel 14 is disposed.

An unillustrated memory board, in which is stored various information per each recording tape cartridge 10, is disposed at the rear right side of the lower case 18. A center portion 18B of a rear wall (i.e., the wall surface facing a robotic hand 60 that is a gripping mechanism) is formed at a surface that slants at a predetermined angle, and the memory board is disposed to slant at the predetermined angle, so that detection of the memory board by the drive device 80, which reads the memory card from a bottom surface side, and the robotic hand 60, which reads the memory card from the rear wall side, is possible. Also, an unillustrated write-protect portion, by which is set the possibility or impossibility of recording onto the recording tape cartridge 10, is disposed at the rear left side of the lower case 18.

Structure of Opening and Case Near Opening

As described above, because the opening 20 is formed by cutting out the right front corner, the opening-plane of the opening 20 faces the direction of arrow A and the direction of arrow B, whereby the pull-out mechanism of the drive device 80 can access and grip the leader pin 22 from the direction of arrow A, the direction of arrow B, or between the direction of arrow A and the direction of arrow B. Thus, the area in which the pin holders 24 that hold the leader pin 22 can be disposed is widened, and the region in which the pull-out mechanism of the drive device 80 can grip the leader pin 22 is widened, whereby it is possible to set the positions at which the pin holders 24 are disposed to match the specification of the drive device 80 that grips the leader pin 22 from the direction of arrow A or the direction of arrow B, and the freedom with which the drive device 80 is designed is also increased.

A pair of short upper and lower slanted walls 30 that regulate a front edge of the opening 20 is disposed at a right end of the front wall 12A of the case 12. The slanted walls 30 curve along the opening-plane of the opening 20 and are thicker than the front wall 12A. A recess 30A, into which is inserted a leading end of a door 50 described later, is formed in a thickness-direction center of the slanted walls 30. A pair of upper and lower screw bosses 32 is connectedly disposed at an inner side of the front wall 12A in a leftward vicinity of the slanted walls 30.

A pair of upper and lower slanted walls 34, which are of a shape substantially along an outer peripheral surface of the door 50 when seen in plan view, is disposed at a front end inner side of a right wall 12B (of the peripheral walls 16A and 18A, the portion whose outer surface faces the direction of arrow B) of the case 12. Front end surfaces of the slanted walls 34 regulate a rear edge of the opening 20, and a pair of upper and lower screw bosses 36 is disposed at those front ends.

A slit 40 of predetermined length, which serves as a window through which the outside of the case 12 communicates with the inside of the case 12, is disposed in the right wall 12B of the case 12. The slit 40 is disposed in order to expose an operational protrusion 52 of the door 50 described later. The slit 40 is formed by cutting out, in a substantial rectangular, a front side lower portion of the peripheral wall 16A of the upper case 16 forming the right wall 12B, and opens frontward toward the opening 20. As shown in FIG. 1, outer surfaces of the screw bosses 36 in the upper case 16 are exposed through the slit 40.

An upper end of the slit 40 may simply be regulated by a top panel of the case 12 (top panel of the upper case 16). However, in consideration of maintaining the rigidity of the case 12 and strength in the event that the case 12 is dropped, it is preferable to leave part of the peripheral wall 16A at the upper side of the slit 40. It is particularly preferable to integrally dispose the upper side wall regulating the slit 40 so that it is continuous from the slanted walls 34.

A protrusion 44 that projects in the inner direction of the case 12 is disposed at the peripheral wall 16A defining the rear end of the slit 40. The protrusion 44 prevents dust from entering into the case 12 and prevents the door 50 from chattering. Also, a recess 48 that is recessed upward from the bottom surface of the case 12, and in which a portion excluding the upper end of the peripheral wall 18A is recessed in the inner direction of the case 12 in a substantially square "U" shape, is disposed in the lower case 18 in the right wall behind the protrusion 44.

The recess 48 is also formed in the left wall of the case 12, and serves as an engagement portion with which a pull-in mechanism (not illustrated) of the drive device 80 engages. A top surface (surface facing downward) of the recess 48 serves as a reference surface for positioning inside the drive device 80. Recesses 46, which have the same structure as that of the recesses 48, are respectively formed behind the right wall recess 48 and the left wall recess 48. The recesses 46 serve as gripped parts with which claws 62 (see FIGS. 3 and 5) of the robotic hand 60 disposed near a library 70 (see FIG. 6) engage.

By disposing the recesses 46 and 48, torsional strength of the case 12 (lower case 18) is improved. Also, the inner surface of the right wall 12B (peripheral wall 18A) regulating the recess 48 curves in correspondence to the outer surface of the door 50 and serves as a guide surface for preventing chattering of the door 50 that slides thereacross when opening and closing off the opening 20. A recess 42 is also formed in a portion of the upper case 16 corresponding to the left wall recess 48. However, the recess 42 serves as an engagement portion with which a retention member for canceling the torque accompanying the movement of the door 50 in the opening direction when the opening 20 is being opened engages.

The above-described upper case 16 and lower case 18 are fixed and joined together by screwing unillustrated screws from below into the respective screw bosses 32 and 36 positioned near the edge of the opening 20. Thus, corners at both ends of the opening 20, which are regulated by free ends of the slanted walls 30 of the front wall 12A and the slanted walls 34 of the right side wall 12B and easily and strongly impact the ground when the case 12 is inadvertently dropped, are strongly joined. Therefore, even if the case 12 is dropped, there is no positional displacement resulting from deformation or buckling due to the overall weight of the recording tape cartridge 10.

The diameter of the screw is, for example, about 2.0 mm, and the outer diameters of the screw bosses 32 and 36 are about 4.0 mm. In place of the upper case 16 and the lower case 18 being fixed with screws, protrusions that project from the upper case 16 may be disposed at positions thereon corresponding to the screw bosses 32 and 36, fitting holes into which the protrusions fit may be disposed in the lower case 18, and the protrusions and the fitting holes may be fitted together. However, in this instance, it is preferable to fix the upper case 16 and the lower case 18 at places within 30 mm of the radius of the fitting sites. Moreover, in consideration of disassemblability and recyclability, it is preferable to fix with screws the surfaces where the peripheral walls 16A and 18A abut against each other.

The plate thickness of areas at which the pin holders 24 are disposed on the upper case 16 and the lower case 18 is 2 mm and relatively thick. The case 12 (i.e., the upper case 16 and the lower case 18) is formed by polycarbonate (PC) material. In terms of the functions of the recording tape cartridge 10, this is the most important and is to raise the strength near the pin holders 24, which are the positions at which the leader pin 22 that is to be properly retained by the pull-out mechanism when the magnetic tape T is to be pulled out is retained (positioned), so that positional displacement of the leader pin 22 does not occur due to shock resulting from the recording tape cartridge 10 being dropped or the like. It should be noted that, in place of PC, the case 12 can also be formed of acrylonitrile-butadiene-styrene (ABS) or metal.

The pin holders 24 in the present embodiment are disposed, as shown in FIGS. 1 and 2, at positions nearer to the screw boss 32 than to the screw boss 36. Thus, positional displacement of the leader pin 24 resulting from vibration of the top panel and the bottom panel when the case 12 is dropped or the like is further prevented.

When seen in plan view, the angle of inclination of the opening-plane of the opening 20 with respect to the direction of arrow A (i.e., the angle of inclination of the top panel and the bottom panel of the case 12, which regulate the top and bottom of the opening 20) is determined in response to the need to distinguish (identify) the recording tape cartridge 10 in the library 70. That is, plural recording tape cartridges 10 are housed in the library 70, the desired recording tape cartridge 10 is automatically taken out therefrom by the robotic hand 60 and conveyed to and loaded in the drive device 80. However, when there are several kinds of recording tape cartridges 10 to be handled and several kinds of drive devices 80, it is necessary to identify the generation and recording capacity of the recording tape cartridges 10, and the angle of inclination of the opening-plane of the opening 20 can be used for this identification.

Thus, because the opening 20, through which the magnetic tape T is pulled out and to which consideration has been given in terms of strength, doubles as an identification portion at the library 70 due to the angle of inclination of the opening-plane of the opening 20, it is possible to prevent the strength of the case 12 from being insufficient, to prevent the ability of the case 12 to prevent ingress of dust from being lowered, and to prevent the mold structure from becoming complicated, which concerns arise when the opening 20 and the identification portion are disposed separately, e.g., when one or several through-holes is disposed in the case 12 as the identification portion. It should be noted that, because the peripheral wall 16A of the upper case 16 and the peripheral wall 18A of the lower case 18 are the same height, the finished precision of the juncture at which they mutually abut (e.g., the precision of the resin molding by the mold) is the same, and assemblability and resistance to dropping impact are good.

Structure of Door

The above-described opening 20 in the case 12 is opened and closed off by the door 50, which serves as a shielding member. The plate width (height) of the door 50 is substantially the same as the opened height of the opening 20, and the plate length of the door 50 is sufficiently larger than the opened width of the opening 20. When seen in plan view, the door 50 is formed in a substantially circular arc that curves in a plate thickness direction, as shown in FIG. 2, so that the door 50 can move along a predetermined circumference.

The door 50 closes off the opening 20 in a state in which the leading end of the door 50 has been inserted into the recess 30A of the slanted walls 30, and opens the opening 20 by moving (rotating) substantially rearward along the predetermined circumference. The door 50 completely opens the opening 20 when the outer peripheral surface near the leading end of the door 50 reaches the vicinity of the screw boss 36. The door 50 closes off the opening 20 by rotating in the direction opposite to the direction in which it rotates when opening the opening 20.

In this manner, the door 50 is curved in a circular arc corresponding to the predetermined circumference that is the locus of its movement. With respect to the rotational center of the door 50, in the present embodiment, the position in the left-right direction is set near the left end of the case 12, and the position in the front-rear direction is set near the rear end of the slit 40. Therefore, the locus of movement of the door 50 is nearest the right wall 12B of the case 12 in the vicinity of the rear end of the slit 40. It should be noted that the radius and rotational center of the door 50 can be appropriately determined in response to the front-rear edges of the opening 20 determined by the demand from the drive device 80, i.e., by the angle of the opening-plane of the opening 20 determined by the demand from the library 70 and the positions of the screw boss 36 and the slanted walls 30.

The curved longitudinal dimension of the door 50 is determined so that the rear end of the door 50 is positioned behind the recess 48 of the case 12, i.e., within the right rear corner near the recess 46, in a state in which the opening 20 is closed off. Thus, the door 50 slides along the guide surfaces of the slanted wall 34, the protrusion 44 and the recess 48 while chatter is prevented during the entire process of opening/closing off the opening 20. It should be noted that the rear lower portion of the door 50 is diagonally cut out in order to avoid the memory board disposed at the rear right side of the lower case 18.

The operational protrusion 52 that serves as an operational portion is disposed at the outer peripheral surface of the door 50 slightly in front of a longitudinal-direction center thereof, and protrudes along the radial direction of the door 50. The operational protrusion 52 is exposed to the outer side of the case 12 through the slit 40, is positioned slightly away from the rear end of the screw boss 36 in a state in which the opening 20 is closed off, and is operable from a portion that opens in the front direction of the slit 40.

In a state in which the opening 20 is opened, the operational protrusion 52 is positioned slightly away from the protrusion 44 at the rear edge of the slit 40. The inside of the case 12 communicates with the outside of the case 12 through the slit 40 for exposing the operational protrusion 52. The slit 40 is ordinarily substantially closed off by the screw boss 36, by the door 50 that spans the substantial overall height within the case 12, and by the protrusion 44 that guides the door 50, and dust is prevented from adhering to the magnetic tape T wound around the reel 14 by the play regulating wall 28 serving as the inner wall.

A spring retainer 54 is disposed at the inner peripheral surface near the rear end of the door 50. One end of a coil spring 56 is retained and held at the spring retainer 54, and another end of the coil spring 56 is retained at an unillustrated spring lock disposed near the recess 48 in the case 12. Thus, the door 50 is always urged by an urging force of the coil spring 56 in the direction in which the opening 20 is closed off, so that the opening 20 is ordinarily closed off.

Because the door 50 is of a length spanning the right end corner of the case 12 in a state in which the opening 20 is closed off, it is possible to dispose the coil spring 56 that serves as an urging member by effectively using the space between the right wall 12B (peripheral walls 16A, 18A) and the play regulating wall 28 in the right end corner. Moreover, the door 50 is formed by, for example, polyoxymethylene (POM) resin, which has excellent abrasion resistance and a low friction coefficient as compared to the case 12 which is formed from PC. However, the operational protrusion 52 and the spring retainer 54 may be structured so that they are separate or made of separate materials.

Structure of Gripped Parts

Figure 3:
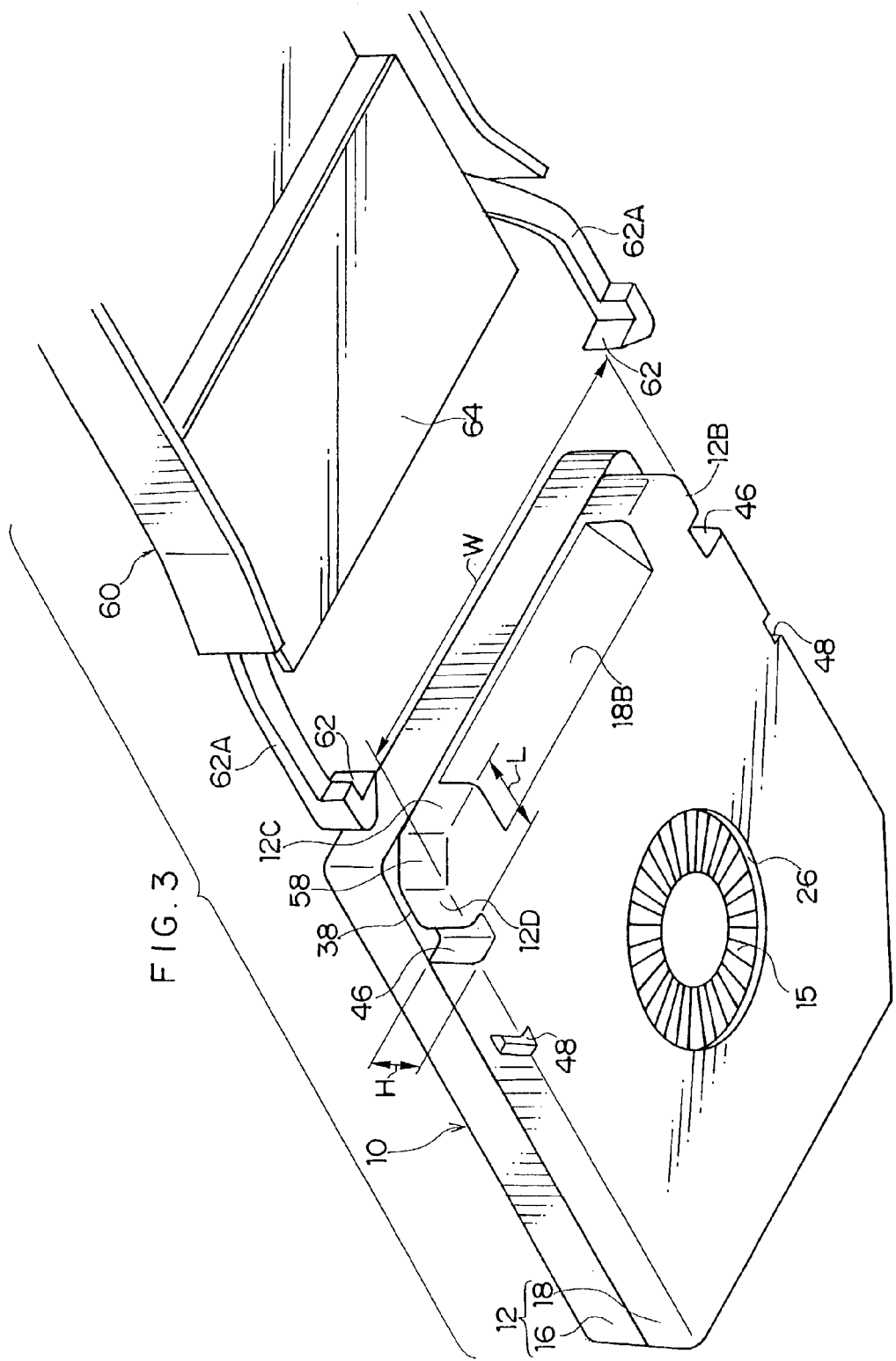
FIG. 3 is a schematic perspective view showing a robotic hand and the recording tape cartridge of the invention.

Next, description will be given of the gripped parts. For convenience of explanation, the left-right direction horizontal width of the outer shape of the recording tape cartridge 10 shown in FIG. 3 is slightly larger than the horizontal width of the recording tape cartridge 11 shown in FIG. 5, and the distance between the claws 62 of the robotic hand 60 is set so that the robotic hand 60 can grip the recording tape cartridge 11 shown in FIG. 5 from both sides. Consideration is not given to the distance (i.e., gap) from a bottom surface 72A of the housing chamber 72 to the bottom surface of the recording tape cartridge 10 or 11 when the recording tape cartridge 10 or 11 is housed in the housing chamber 72 of the library 70 shown in FIG. 6.

Figure 5:
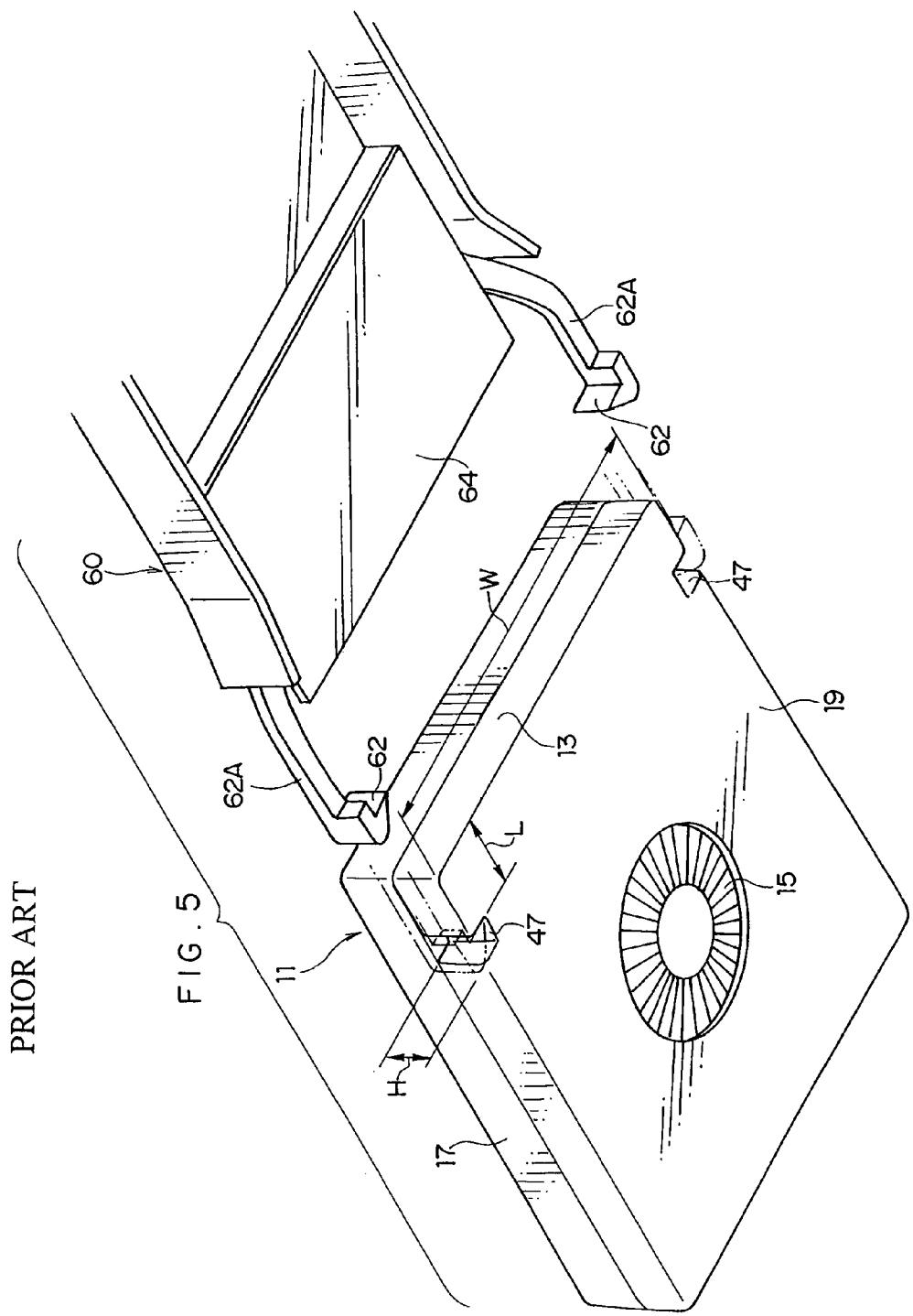
FIG. 5 is a schematic perspective view showing the robotic hand and a standard recording tape cartridge.

As described above, when the robotic hand 60 grips the recording tape cartridge 11, the claws 62 are inserted into recesses 47 of a lower case 19, as shown in FIG. 5. At this time, a height (in this instance, the height of a peripheral wall of the lower case 19) H from the bottom surface 72A of the housing chamber 72 of the library 70 in which the recording tape cartridge 11 is housed to the top surface (i.e., lower surface of a peripheral wall of an upper case 17) of the recesses 47 and a length L from the rear wall 13 to both side walls of the lower case 19 are stored as data in a control device (not illustrated) of the robotic hand 60. Because the distance between the claws 62 is set to match a distance (horizontal width) W between both side walls of the lower case 19, the robotic hand 60 can precisely grip the recording tape cartridge 11.

In other words, the robotic hand 60 grips the recording tape cartridge 11 depending on the data. In the recording tape cartridge 10 in which the outer shape (size) shown in FIGS. 1 through 3 is different, the gripped parts that are gripped by the robotic hand 60, i.e., the recesses 46, are disposed at positions that are the same as those of the recesses 47 of the recording tape cartridge 11 shown in FIG. 5.

That is, as shown in FIG. 3, a length L seen in side view from the rear wall 12C (rear wall of the lower case 18) of the case 12 to the recess 46, a height (in this instance, a height of the peripheral wall 18A of the lower case 18) H from the bottom surface 72A of the housing chamber 72 of the library 70 to the top surface (i.e., the lower surface of the peripheral wall 16A of the upper case 16) of the recess 46, and the distance (horizontal width) W between the recesses 46, i.e., between both side walls 12B and 12D (both side walls of the lower case 18) of the case 12 behind the recesses 46 are formed with dimensions that are the same as the instance of the recesses 47 of the recording tape cartridge 11 in FIG. 5.

Therefore, it is possible for the recording tape cartridge 10 to be precisely gripped by the robotic hand 60, even when the front-rear direction length (depth) in front of the recesses 46 of the case 12 and the height of the peripheral wall 16A of the upper case 16 are formed slightly large. It should be noted that, as a result of molding these with the same dimensions, in the recording tape cartridge 10 shown in FIG. 3, both side walls 12B and 12D behind the recesses 46 of the lower case 18 are positioned further inside than the peripheral wall 16A of the upper case 16 when seen in bottom plan view, and steps 38 are formed at those portions.

Figure 4:
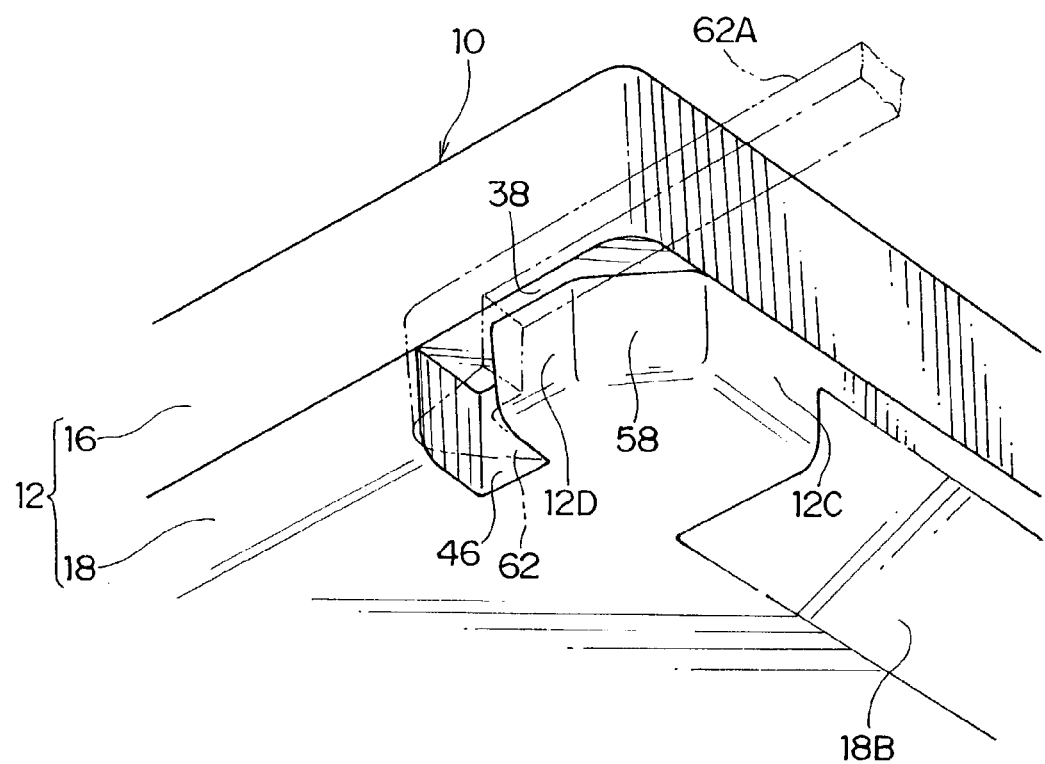
FIG. 4 is a schematic perspective view showing claws of the robotic hand and gripped parts of a case of the recording tape cartridge of the invention.

The step 38 is not formed according to the horizontal width dimension of the lower case 18. However, when the step 38 is formed, as shown in FIG. 4, an arm 62A of the claw 62 abuts against the step 38, whereby it becomes possible to support the case 12 (the recording tape cartridge 10) from below. Therefore, it is possible to support the recording tape cartridge 10 more reliably than in an instance where the recording tape cartridge 10 is supported only by the support 64. Therefore, it is possibly to more effectively prevent errors such as the robotic hand 60 dropping the recording tape cartridge 10. Because it also becomes possible to use the lower surface of the peripheral wall 16A in the step 38 as a reference surface in the height direction, it becomes possible to more precisely position the recording tape cartridge 10 in the drive device 80 and in the library 70.

In addition, as shown in FIGS. 3 and 4, both rear side corners of the lower case 18 form slanted walls 58 that are diagonally cut out when seen in bottom plan view. The slanted walls 58 have the function of guiding the claws 62 to the recesses 46 when the positions of the claws 62 of the robotic hand 60 have deviated somewhat in the left-right direction. However, they may not be formed depending on the structure of the claws 62. Because the rear wall center portion 18B of the lower case 18 is formed as a slanted surface, the support 64 can reliably support the rear bottom surface of the case 12.

Next, the action of the gripped part of the recording tape cartridge will be described. First, as shown in FIG. 5, the recording tape cartridge 11 is taken out from the housing chamber 72 of the library 70 by the robotic hand 60. At this time, because the robotic hand 60 is structured to match the respective dimensions of the recording tape cartridge 11, the claws 62 are smoothly inserted into the recesses 47. The recording tape cartridge 11 that has been taken out from the library 70 is conveyed to and loaded in the drive device 80, and the recording of information onto and playback of information from the magnetic tape T is effected.

Next, as shown in FIG. 3, the recording tape cartridge 10 is taken out from the housing chamber 72 of the library 70 by the robotic hand 60. At this time, because the recesses 46 of the recording tape cartridge 10 are disposed at dimensional positions that are the same as those of the recesses 47 of the recording tape cartridge 11, the claws 62 of the robotic hand 60 are smoothly inserted into the recesses 46 in the same manner as in the case of the recording tape cartridge 11.

Because the steps 38 are formed behind the recesses 46, it becomes possible for the recording tape cartridge 10 to be supported from below by the arms 62A of the claws 62, as shown in FIG. 4. Therefore, it is possible to support the recording tape cartridge 10 more reliably than in an instance where the recording tape cartridge 10 is supported only by the support 64, and errors such as the recording tape cartridge 10 falling from the robotic hand 60 never occur. Thus, the recording tape cartridge 10 that has been taken out from the library 70 is conveyed to and loaded in the drive device 80, and the recording of information onto and playback of information from the magnetic tape T is effected.

That is, with regard to the recording tape cartridge 10 that has been loaded into the drive device 80, an engaging protrusion (not illustrated) that serves as an open/close member advances forward to the opened slit 40 and engages with the operational protrusion 52 of the door 50. When the recording tape cartridge 10 (case 12) is further pushed in this state, the engaging protrusion causes the operational protrusion 52 to move rearward (causes it to relatively move rearward with respect to the case 12 that is loaded in the direction of arrow A) counter to the urging force of the coil spring 56 due to the pushing force.

Thus, the outer peripheral surface of the door 50 on which the operational protrusion 52 is projectingly disposed rotates clockwise when seen in plan view along the curved direction thereof while being regulated by the guide surfaces of the slanted wall 34, the protrusion 44 and the recesses 48. That is, the door 50 moves substantially rearward around the outer side of the pin holders 24 and the reel 14 to open the opening 20, without sticking out from the movement locus along its curved shape. Further, when the case 12 (recording tape cartridge 10) is loaded to a predetermined depth, the opening 20 is completely opened.

When the recording tape cartridge 10 is positioned within the drive device 80 in this state, further rotation (movement substantially rearward) of the door 50 is regulated, the pull-out mechanism of the drive device 80 advances into the case 12 through the opened opening 20, the pull-out mechanism pulls out the leader pin 22 positioned and held in the pin holders 24 and accommodates the leader pin 22 at the unillustrated take-up reel. The magnetic tape T is successively pulled out from the case 12 and taken up at the take-up reel by the take-up reel and the reel 14 being synchronously rotatingly driven, and the recording and playback of information is effected by a recording head disposed along the predetermined tape path.

When the magnetic tape T is rewound at the reel 14 and the recording tape cartridge 10 is discharged from the drive device 80, the recording tape cartridge 10 is released from its positioned state and is moved in the direction opposite to the direction of arrow A by the urging force of the coil spring 56 or an unillustrated ejection mechanism. The door 50 is rotated in the closed direction of the opening 20 by the urging force of the coil spring 56 while the outer peripheral surface of the door 50 is regulated along the guide surfaces of the slanted wall 34, the projections 44, and the recesses 48. The leading end of the door 50 is inserted into the recess 30A of the slanted walls 30, and the opening 20 is completely closed and restored to its initial state.

Thus, when the recording tape cartridge 10 is discharged from the drive device 80, the robotic hand 60 approaches the recording tape cartridge 10, the claws 62 are inserted into the recesses 46, and the recording tape cartridge 10 is gripped from both sides. The recording tape cartridge 10 is then conveyed to and housed in the predetermined housing chamber 72 of the library 70. Thus, the recording tape cartridge 10 is again stored in the library 70.

As described above, because the disposed position dimensions of the gripped parts (recesses 46) that are gripped by the robotic hand 60 are made the same or common in various recording tape cartridges of different sizes, the robotic hand 60 can precisely grip each type of recording tape cartridge regardless of size. Because it is not necessary to adjust the distance between the claws of the robotic hand, the robotic hand can be structured simply and inexpensively in which the distance between the claws is unadjustable. Because it is also not necessary to prepare a library for each type of recording tape cartridge, it is possible to reduce overall costs and labor time.

According to the invention, because the structure of gripped parts of recording tape cartridges that are gripped by a gripping mechanism of a library is made common or standardized, the gripping mechanism can precisely grip the recording tape cartridges regardless of type or size. Therefore, an inexpensive and simple structure can be adopted for the gripping mechanism, and it is possible to reduce overall costs.

What is claimed is:

1. A gripped part structure of recording tape cartridges for allowing recording tape cartridges with at least one of different sizes and different types of leader member, each recording tape cartridge comprising a case rotatably housing therein a reel wound with recording tape and gripped parts that are formed in the case and gripped by a gripping mechanism of a library, to be housed in a same library, wherein
   a height of the gripped parts in a thickness direction of the recording tape cartridges is identical for each recording tape cartridge regardless of the leader member or the size of the case of the recording tape cartridge,
   a distance between the gripped parts in both side walls of the case parallel to a direction in which the recording tape cartridge is housed in the library is identical for each recording tape cartridge regardless of the leader member or the size of the case of the recording tape cartridge, and
   wherein the case comprises an upper case and a lower case, the gripped parts are formed in the lower case, and steps are formed at a juncture where the upper case and the lower case are joined, which juncture is near the gripped parts.

2. The gripped part structure of claim 1, wherein corners of the case near the gripped parts are slanted.

3. The gripped part structure of claim 1, wherein a wall surface of the lower case facing the gripping mechanism of the library is slanted.

4. The gripped part structure of claim 1, wherein the gripped parts are formed by cutting out both side walls of the case in recessed shapes.

5. A gripped part structure of recording tape cartridges with at least one of different leader members or sizes housed in a same library, with each recording tape cartridge comprising
   a case housing therein recording tape,
   two gripped parts that are gripped by a gripping mechanism of the library, wherein
   the gripped parts are formed in the case,
   a distance from a side wall of the case facing the gripping mechanism of the library to the gripped parts is identical for each recording tape cartridge regardless of the leader member or size of recording tape cartridge,
   a height of the gripped parts in a thickness direction of the recording tape cartridge is identical for each recording tape cartridge regardless of the leader member or size of recording tape cartridge,
   a distance between the gripped parts is identical for each recording tape cartridge regardless of the size or leader member of recording tape cartridge, and
   wherein the case comprises an upper case and a lower case, the gripped parts are formed in the lower case, and steps are formed at a juncture where the upper case and the lower case are joined, which juncture is near the gripped parts.

6. The gripped part structure of claim 5, wherein corners of the case near the gripped parts are slanted.

7. The gripped part structure of claim 5, wherein a wall surface of the lower case facing the gripping mechanism of the library is slanted.

8. The gripped part structure of claim 5, wherein the gripped parts are formed by cutting out, in recessed shapes, a side wall of the case that is substantially parallel to a direction in which the recording tape cartridges are housed in the library.

9. A tape cartridge storage comprising:
   a tape cartridge library;
   two tape cartridges with at least one of a different size and a different leader member housed in the library, wherein each cartridge comprises a case rotatably housing therein a reel wound with recording tape and each cartridge also comprising gripped parts formed in the case;
   a gripping mechanism which grips the gripped parts of the tape cartridges;
   wherein a height of the gripped parts in a thickness direction of the recording tape cartridges is identical for each recording tape cartridge;
   wherein a distance between the gripped parts in both side walls of the case parallel to a direction in which the recording tape cartridge is housed in the library is identical for each recording tape cartridge; and
   wherein the case comprises an upper case and a lower case, the gripped parts are formed in the lower case, and steps are formed at a juncture where the upper case and the lower case are joined, which juncture is near the gripped parts.

10. The tape cartridge storage of claim 9, wherein corners of the case near the gripped parts are slanted.

11. The tape cartridge storage of claim 9, wherein a wall surface of the lower case facing the gripping mechanism of the library is slanted.

12. The tape cartridge storage of claim 9, wherein the gripped parts are formed by cutting out both side walls of the case in recessed shapes.

13. A recording tape cartridge comprising:
    a case comprising sidewalls;
    a recording tape housed in the case;

gripped parts formed at side walls of the case,
wherein a distance between portions of the side walls where the gripped parts are formed is different than a distance between portions of the side walls where the gripped parts are not formed;
wherein the distance between portions of the side walls where the gripped parts are formed is set to a certain value which does not depend upon the distance between portions of the sidewalls where the gripped parts are not formed; and
wherein the case comprises an upper case and a lower case, and the gripped parts are formed in the lower case, and steps are formed at a juncture where the upper case and the lower case are joined, which juncture is near the gripped parts.

14. The recording tape cartridge of claim 13, wherein a height, in a thickness direction of the case, of portions of the side walls where the gripped parts are formed is set to a certain value which does not depend upon a height, in the thickness direction of the case, of the portions of the side walls where the gripped parts are not formed.

15. The recording tape cartridge of claim 13, wherein corners of the case near the gripped parts are slanted.

16. The recording tape cartridge of claim 13, wherein the case comprises an upper case and a lower case, and a wall surface of the lower case facing a gripping mechanism of a library is slanted.

17. The recording tape cartridge of claim 13, wherein the gripped parts are formed by cutting both side walls of the case in recessed shapes.

18. The recording tape cartridge of claim 13, wherein two gripped parts are formed, and a distance from the gripped parts to a side wall of the case facing a gripping mechanism of a library is identical for each recording tape cartridge regardless of a distance from the gripped parts to a side wall that is opposite to the side wall facing the gripping mechanism.

* * * * *